United States Patent
Dropps et al.

(10) Patent No.: US 7,936,771 B2
(45) Date of Patent: *May 3, 2011

(54) METHOD AND SYSTEM FOR ROUTING FIBRE CHANNEL FRAMES

(75) Inventors: Frank R. Dropps, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/189,502

(22) Filed: Aug. 11, 2008

(65) Prior Publication Data

US 2009/0034550 A1 Feb. 5, 2009

(51) Int. Cl.
*H04L 12/28* (2006.01)

(52) U.S. Cl. ...................................... 370/412

(58) Field of Classification Search .......... 370/230, 370/231, 235, 236, 389, 395, 400, 412, 417, 370/463, 474, 503, 235.1, 428, 429, 395.4
See application file for complete search history.

(56) References Cited

U.S. PATENT DOCUMENTS

| | | | |
|---|---|---|---|
| 4,964,119 A | 10/1990 | Endo et al. | |
| 5,258,751 A | 11/1993 | DeLuca et al. | |
| 5,280,483 A | 1/1994 | Kamoi et al. | |
| 5,291,481 A | 3/1994 | Doshi et al. | |
| 5,425,022 A | 6/1995 | Clark et al. | |
| 5,568,167 A | 10/1996 | Galbi et al. | |
| 5,579,443 A | 11/1996 | Tatematsu et al. | |
| 5,638,518 A | 6/1997 | Malladi | |
| 5,687,387 A | 11/1997 | Endejan et al. | |
| 5,751,710 A | 5/1998 | Crowther et al. | |
| 5,757,771 A | 5/1998 | Li et al. | |
| 5,835,748 A | 11/1998 | Orenstein et al. | |
| 5,892,604 A | 4/1999 | Yamanaka et al. | |
| 5,925,119 A | 7/1999 | Maroney | |
| 6,009,226 A | 12/1999 | Tsuji et al. | |
| 6,118,791 A | 9/2000 | Fichou et al. | |
| 6,131,123 A | 10/2000 | Hurst et al. | |
| 6,147,976 A | 11/2000 | Shand et al. | |
| 6,148,421 A | 11/2000 | Hoese et al. | |
| 6,158,014 A | 12/2000 | Henson | |

(Continued)

OTHER PUBLICATIONS

"Office Action from China State Intellectual Property Office dated Dec. 11, 2009 for Chinese Application No. 200580032948.4".

(Continued)

*Primary Examiner* — Chi H Pham
*Assistant Examiner* — Alexander Boakye
(74) *Attorney, Agent, or Firm* — Klein, O'Neil & Singh, LLP

(57) ABSTRACT

A method and system for transmitting frames using a fiber channel switch element is provided. The switch element includes a port having a receive segment and a transmit segment, wherein the fiber channel switch element determines if a port link has been reset; determines if a flush state has been enabled for the port; and removes frames from a buffer, if the flush state has been enabled for the port. For a flush state operation, frames are removed from a receive buffer of the fiber channel port as if it is a typical fiber channel frame transfer. The removed frames are sent to a processor for analysis. The method also includes, setting a control bit for activating frame removal from the transmit buffer; and diverting frames that are waiting in the transmit buffer and have not been able to move from the transmit buffer.

13 Claims, 10 Drawing Sheets

U.S. PATENT DOCUMENTS

| | | |
|---|---|---|
| 6,278,708 B1 | 8/2001 | Von Hammerstein et al. |
| 6,286,011 B1 | 9/2001 | Velamuri et al. |
| 6,307,857 B1 | 10/2001 | Yokoyama et al. |
| 6,311,204 B1 | 10/2001 | Mills et al. |
| 6,339,813 B1 | 1/2002 | Smith et al. |
| 6,397,360 B1 | 5/2002 | Bruns |
| 6,404,749 B1 | 6/2002 | Falk |
| 6,438,628 B1 | 8/2002 | Messerly et al. |
| 6,480,500 B1 | 11/2002 | Erimli et al. |
| 6,509,988 B1 | 1/2003 | Saito |
| 6,553,036 B1 | 4/2003 | Miller et al. |
| 6,563,796 B1 | 5/2003 | Saito |
| 6,625,157 B2 * | 9/2003 | Niu et al. ............. 370/395.71 |
| 6,629,161 B2 | 9/2003 | Matsuki et al. |
| 6,643,298 B1 | 11/2003 | Brunheroto et al. |
| 6,697,914 B1 | 2/2004 | Hospodor et al. |
| 6,700,877 B1 | 3/2004 | Lorenz et al. |
| 6,765,871 B1 | 7/2004 | Knobel et al. |
| 6,865,155 B1 | 3/2005 | Wong et al. |
| 6,888,831 B1 | 5/2005 | Hospodor et al. |
| 6,904,507 B2 | 6/2005 | Gil |
| 6,922,408 B2 | 7/2005 | Bloch et al. |
| 6,928,470 B1 | 8/2005 | Hamlin |
| 6,975,627 B1 | 12/2005 | Parry et al. |
| 6,983,342 B2 | 1/2006 | Helenic et al. |
| 7,031,615 B2 | 4/2006 | Genrile |
| 7,076,569 B1 | 7/2006 | Bailey et al. |
| 7,082,126 B2 | 7/2006 | Ain et al. |
| 7,150,021 B1 | 12/2006 | Vajjhala et al. |
| 7,187,688 B2 | 3/2007 | Garmire et al. |
| 7,209,478 B2 | 4/2007 | Rojas et al. |
| 7,233,570 B2 | 6/2007 | Gregg |
| 7,239,641 B1 | 7/2007 | Banks et al. |
| 7,245,627 B2 | 7/2007 | Goldenberg et al. |
| 7,275,103 B1 * | 9/2007 | Thrasher et al. ............. 709/224 |
| 7,310,389 B2 | 12/2007 | Waschura et al. |
| 7,319,669 B1 | 1/2008 | Kunz et al. |
| 7,334,046 B1 | 2/2008 | Betker |
| 7,346,707 B1 | 3/2008 | Erimli |
| 7,352,701 B1 | 4/2008 | Kunz |
| 7,362,702 B2 * | 4/2008 | Terrell et al. .................. 370/230 |
| 7,397,788 B2 | 7/2008 | Mies et al. |
| 7,406,034 B1 | 7/2008 | Cometto et al. |
| 7,406,092 B2 | 7/2008 | Dropps et al. |
| 7,424,533 B1 | 9/2008 | Di Benedetto et al. |
| 7,443,794 B2 | 10/2008 | George et al. |
| 7,447,224 B2 * | 11/2008 | Dropps et al. ................ 370/412 |
| 7,460,534 B1 | 12/2008 | Ballenger |
| 7,466,700 B2 | 12/2008 | Dropps et al. |
| 7,471,691 B2 | 12/2008 | Black et al. |
| 7,492,780 B1 | 2/2009 | Goolsby |
| 2002/0067726 A1 | 6/2002 | Ganesh et al. |
| 2002/0118692 A1 | 8/2002 | Oberman et al. |
| 2002/0124102 A1 | 9/2002 | Kramer et al. |
| 2003/0002516 A1 | 1/2003 | Boock et al. |
| 2003/0033487 A1 | 2/2003 | Pfister et al. |
| 2003/0037159 A1 | 2/2003 | Zhao et al. |
| 2003/0063567 A1 | 4/2003 | Dehart |
| 2003/0091062 A1 | 5/2003 | Lay et al. |
| 2003/0095549 A1 | 5/2003 | Berman |
| 2003/0112819 A1 | 6/2003 | Kofoed et al. |
| 2003/0120791 A1 | 6/2003 | Weber et al. |
| 2003/0152076 A1 | 8/2003 | Lee et al. |
| 2003/0179748 A1 | 9/2003 | George et al. |
| 2003/0191883 A1 | 10/2003 | April |
| 2004/0027989 A1 | 2/2004 | Martin et al. |
| 2004/0064664 A1 | 4/2004 | Gil |
| 2004/0085974 A1 | 5/2004 | Mies et al. |
| 2004/0120340 A1 | 6/2004 | Furey et al. |
| 2004/0125799 A1 | 7/2004 | Buer |
| 2004/0141518 A1 | 7/2004 | Milligan et al. |
| 2004/0153566 A1 | 8/2004 | Lalsangi et al. |
| 2004/0153863 A1 | 8/2004 | Klotz et al. |
| 2004/0202189 A1 | 10/2004 | Arndt et al. |
| 2004/0218531 A1 | 11/2004 | Cherian et al. |
| 2005/0036485 A1 | 2/2005 | Eilers et al. |
| 2005/0099970 A1 | 5/2005 | Halliday |
| 2005/0111845 A1 | 5/2005 | Nelson et al. |
| 2005/0188245 A1 | 8/2005 | Seto et al. |

OTHER PUBLICATIONS

"Office Action from USPTO dated Jan. 6, 2010 for U.S. Appl. No. 10/956,501".

"Office Action from State Intellectual Property Office dated Dec. 4, 2009 for Chinese Application No. 200580032947.X".

"Notice of Allowance from USPTO dated Jan. 21, 2010 for U.S. Appl. No. 10/894,547".

"Office Action from USPTO dated Jan. 26, 2010 for U.S. Appl. No. 10/956,501".

"Final Office Action from USPTO dated Feb. 12, 2010 for U.S. Appl. No. 10/894,732".

"Final Office Action from USPTO dated Jul. 9, 2008 for U.S. Appl. No. 10/894,917".

"Notice of Allowance from USPTO dated Jul. 9, 2008 for U.S. Appl. No. 10/894,629".

"Notice of Allowance from USPTO dated Jul. 9, 2008 for U.S. Appl. No. 10/894,579".

"Notice of Allowance from USPTO dated Jul. 17, 2008 for U.S. Appl. No. 10/894,536".

"Office Action from USPTO dated Jul. 25, 2008 for U.S. Appl. No. 10/894,827".

"Office Action from State Intellectual Property Office (SIPO) of China for Chinese application 200580032889.0".

"Final Office Action from USPTO Dated Aug. 4, 2008 for U.S. Appl. No. 10/894,732".

"Final Office Action from USPTO dated Aug. 20, 2008 for U.S. Appl. No. 10/798,468".

"Office Action from USPTO dated Sep. 18, 2008 for U.S. Appl. No. 10/894,978".

"Office Action from USPTO dated Sep. 23, 2008 for U.S. Appl. No. 10/894,585".

"Project-T11/619-D/Rev. 0.50", *Information technology Industry Council, Fibre Channel: Framing and Signaling-2*, Dec. 2004, Rev. 0.50, (Dec. 2004),76, 81, 114, 115.

"Notice of Allowance from the USPTO dated Sep. 29, 2008 for U.S. Appl. No. 10/889,267".

"Office Action from USPTO dated Sep. 29, 2008 for U.S. Appl. No. 11/363,365".

"Final Office Action from USPTO dated Oct. 8, 2008 for U.S. Appl. No. 11/057,912".

"Non-Final Office Action from USPTO dated Oct. 10, 2008 for U.S. Appl. No. 10/894,627".

"Notice of Allowance from USPTO dated Oct. 8, 2008 for U.S. Appl. No. 10/889,255".

"Notice of Allowance from USPTO dated Oct. 8, 2008 for U.S. Appl. No. 10/798,527".

"Notice of Allowance from USPTO dated Oct. 15, 2008 for U.S. Appl. No. 10/894,492".

"Final Office Action from USPTO dated Oct. 17, 2008 for U.S. Appl. No. 10/894,595".

"Final Office Action from USPTO dated Nov. 13, 2008 for U.S. Appl. No. 10/894,587".

"Office Action from USPTO dated Nov. 13, 2008 for U.S. Appl. No. 10/894,917".

"Office Action from USPTO dated Nov. 26, 2008 for U.S. Appl. No. 10/956,502".

"Office Action from USPTO dated Nov. 26, 2008 for U.S. Appl. No. 10/894,547".

"Final Office Action from USPTO dated Dec. 24, 2008 for U.S. Appl. No. 10/894,726".

"Office Action from USPTO dated Dec. 23, 2008 for U.S. Appl. No. 10/798,468".

"Notice of Allowance from USPTO dated Dec. 30, 2008 for U.S. Appl. No. 11/037,922".

"Final Office Action from USPTO dated Jan. 21, 2009 for U.S. Appl. No. 10/894,827".

"Office Action from USPTO dated Jan. 17, 2009 for U.S. Appl. No. 10/894,586".

"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".
"Notice of Allowance from USPTO dated Mar. 6, 2009 for U.S. Appl. No. 10/956,502".
"Office Action from USPTO dated Mar. 9, 2009 for U.S. Appl. No. 11/057,912".
"Notice of Allowance from USPTO dated Mar. 9, 2009 for U.S. Appl. No. 10/889,635".
"Office Action from USPTO dated Mar. 16, 2009 for U.S. Appl. No. 10/956,501".
"Notice of Allowance from USPTO dated Mar. 20, 2009 for U.S. Appl. No. 10/894,978".
"Notice of Allowance from USPTO dated Mar. 23, 2009 for U.S. Appl. No. 12/198,644".
"Office Action from USPTO dated Mar. 25, 2009 for U.S. Appl. No. 10/894,546".
"Notice of Allowance from USPTO dated Mar. 31, 2009 for U.S. Appl. No. 12/031,585".
"Office Action from USPTO dated Apr. 2, 2009 for U.S. Appl. No. 10/889,256".
"Examination Report from European Patent Office dated Mar. 27, 2009 for European Application No. 05798761.2".
"Notice of Allowance from USPTO dated Apr. 27, 2009 for U.S. Appl. No. 11/363,365".
"Notice of Allowance from USPTO dated May 5, 2009 for U.S. Appl. No. 10/798,468".
"Office Action from USPTO dated May 14, 2009 for U.S. Appl. No. 11/682,199".
"Notice of Allowance from USPTO dated May 18, 2009 for U.S. Appl. No. 10/894,917".
"Notice of Allowance from USPTO dated May 26, 2009 for U.S. Appl. No. 10/894,627".
"Office Action from USPTO dated Jun. 25, 2009 for U.S. Appl. No. 10/894,547".
"Notice of Allowance from USPTO dated Jul. 6, 2009 for U.S. Appl. No. 10/894,587".
"Notice of Allowance from USPTO dated Jul. 9, 2009 for U.S. Appl. No. 10/894,726".
"Office Action from USPTO dated Jul. 23, 2009 for U.S. Appl. No. 10/894,732".
"Office Action from Chinese State Intellectual Property Office dated Jul. 10, 2009 for Chinese Application No. 200580032888.6".
"Office Action dated Jun. 19, 2009 from State Intellectual Property Office for Chinese Application No. 200580032948.4".
"Office Action from USPTO dated Sep. 8, 2009 for U.S. Appl. No. 11/743,852".
"Final Office Action from USPTO dated Sep. 15, 2009 for U.S. Appl. No. 10/956,501".
"Office Action from USPTO dated Sep. 25, 2009 for U.S. Appl. No. 11/682,199".
"Final Office Action from USPTO dated Oct. 26, 2009 for U.S. Appl. No. 10/894,546".
"Notice of Allowance from USPTO dated Nov. 2, 2009 for U.S. Appl. No. 12/189,497".
"Final Office Action from USPTO dated Nov. 10, 2009 for U.S. Appl. No. 11/057,912".
"Office Action from USPTO dated Dec. 2, 2009 for U.S. Appl. No. 12/141,519".
"Final Office Action from USPTO dated Aug. 16, 2010 for U.S. Appl. No. 10/956,501".
"Notice of Allowance from USPTO dated Aug. 18, 2010 for U.S. Appl. No. 10/957,465".
"Notice of Allowance from USPTO dated Aug. 19, 2010 for U.S. Appl. No. 12/267,188".
"Notice of Allowance from USPTO dated Aug. 18, 2010 for U.S. Appl. No. 12/191,890".
"Office Action from USPTO dated Sep. 23, 2010 for U.S. Appl. No. 12/476,068".
"Final Office Action from USPTO dated Mar. 4, 2010 for U.S. Appl. No. 10/957,465".
"Notice of Allowance from USPTO dated Apr. 7, 2010 for U.S. Appl. No. 11/682,199".
"Office Action from USPTO dated Apr. 23, 2010 for U.S. Appl. No. 12/191,890".
"Communication Under Rule 71(3) EPC indicating allowance of application dated Apr. 9, 2010 from European Patent Office for European Application No. 05798761.2".
"Notification of Grant of Patent from the State Intellectual Property Office of P.R.C. dated Mar. 25, 2010 for Chinese Application No. 200580032948.4".
"Office Action from USPTO dated May 27, 2010 for U.S. Appl. No. 12/267,188".
"Notice of Allowance from USPTO dated May 28, 2010 for U.S. Appl. No. 12/141,519".
"Office Action from State Intellectual Property Office of China dated May 20, 2010 for Chinese Application No. 200580032947.X".
"Office Action from USPTO dated Jun. 10, 2010 for U.S. Appl. No. 12/259,197".
"Notice of Allowance from USPTO dated Jul. 19, 2010 for U.S. Appl. No. 10/894,546".

* cited by examiner

METHOD AND SYSTEM FOR ROUTING FIBRE CHANNEL FRAMES

CROSS REFERENCE TO RELATED APPLICATIONS

This application claims priority under 35 U.S.C. §119(e)(1) to the following provisional patent applications:

Filed on Sep. 19, 2003, Ser. No. 60/503,812, entitled "Method and System for Fibre Channel Switches";

Filed on Jan. 21, 2004, Ser. No. 60/537,933 entitled "Method And System For Routing And Filtering Network Data Packets In Fibre Channel Systems";

Filed on Jul. 21, 2003, Ser. No. 60/488,757, entitled "Method and System for Selecting Virtual Lanes in Fibre Channel Switches";

Filed on Dec. 29, 2003, Ser. No. 60/532,965, entitled "Programmable Pseudo Virtual Lanes for Fibre Channel Systems";

Filed on Sep. 19, 2003, Ser. No. 60/504,038, entitled "Method and System for Reducing Latency and Congestion in Fibre Channel Switches";

Filed on Aug. 14, 2003, Ser. No. 60/495,212, entitled "Method and System for Detecting Congestion and Over Subscription in a Fibre channel Network";

Filed on Aug. 14, 2003, Ser. No. 60/495, 165, entitled "LUN Based Hard Zoning in Fibre Channel Switches";

Filed on Sep. 19, 2003, Ser. No. 60/503,809, entitled "Multi Speed Cut Through Operation in Fibre Channel Switches";

Filed on Sep. 23, 2003, Ser. No. 60/505,381, entitled "Method and System for Improving bandwidth and reducing Idles in Fibre Channel Switches";

Filed on Sep. 23, 2003, Ser. No. 60/505,195, entitled "Method and System for Keeping a Fibre Channel Arbitrated Loop Open During Frame Gaps";

Filed on Mar. 30, 2004, Ser. No. 60/557,613, entitled "Method and System for Congestion Control based on Optimum Bandwidth Allocation in a Fibre Channel Switch";

Filed on Sep. 23, 2003, Ser. No. 60/505,075, entitled "Method and System for Programmable Data Dependent Network Routing";

Filed on Sep. 19, 2003, Ser. No. 60/504,950, entitled "Method and System for Power Control of Fibre Channel Switches";

Filed on Dec. 29, 2003, Ser. No. 60/532,967, entitled "Method and System for Buffer to Buffer Credit recovery in Fibre Channel Systems Using Virtual and/or Pseudo Virtual Lane";

Filed on Dec. 29, 2003, Ser. No. 60/532,966, entitled "Method And System For Using Extended Fabric Features With Fibre Channel Switch Elements";

Filed on Mar. 4, 2004, Ser. No. 60/550,250, entitled "Method And System for Programmable Data Dependent Network Routing";

Filed on May 7, 2004, Ser. No. 60/569,436, entitled "Method And System For Congestion Control In A Fibre Channel Switch";

Filed on May 18, 2004, Ser. No. 60/572,197, entitled "Method and System for Configuring Fibre Channel Ports" and Filed on Dec. 29, 2003, Ser. No. 60/532,963 entitled "Method and System for Managing Traffic in Fibre Channel Switches".

The disclosure of the foregoing applications is incorporated herein by reference in their entirety.

BACKGROUND

1. Field of the Invention

The present invention relates to fibre channel systems, and more particularly, to improving fibre channel switch efficiency.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

Fibre channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A fibre channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port fibre channel switch.

Fibre channel switches use memory buffers to hold frames received (at receive buffers) and sent across (via transmit buffers) a network. Associated with these buffers are credits, which are the number of frames that a buffer can hold per fabric port.

In conventional switches a link may be reset (for various reasons), and before the link goes up, it must free up receive buffers so that it has full credit. However, frame flow is halted in other links that are not affected by the reset. Hence, during reset of a link, other unaffected links stay idle. This is inefficient and affects overall performance.

Also, often frames wait in transmit buffers (for whatever reason) and cause congestion. Conventional switches do not allow efficient disposal of such frames.

Therefore, what is required is a method and system for fibre channel switches that can flush the buffers without disrupting frame flow in unaffected links, and also divert frames that have been waiting for transmission.

SUMMARY OF THE PRESENT INVENTION

In one aspect of the present invention, a method for transmitting frames using a fibre channel switch element is provided. The method includes, determining if a fibre channel switch element port link has been reset; determining if a flush state has been enabled for the port; and removing frames from a receive buffer, if the flush state has been enabled for the port. Fibre channel switch element firmware sets a control bit to enable flush state operation.

If the flush state is not enabled, then the port operates as a typical fibre channel port. For a flush state operation, frames are removed from a receive buffer of the fibre channel port as if it is a typical fibre channel frame transfer. The removed frames are sent to a processor for analysis.

In yet another aspect of the present invention, a method for removing frames from a transmit buffer of a fibre channel switch element is provided. The method includes, setting a control bit for activating frame removal from the transmit buffer; and diverting frames that are waiting in the transmit buffer and have not been able to move from the transmit buffer.

If the diverted frames are or Class 2 or 3, the frames are tossed and a Class 2 frame may be truncated before being diverted.

In yet another aspect of the present invention, a fibre channel switch element is provided, including a port having a receive segment and a transmit segment, wherein the fibre channel switch element determines if a port link has been reset; determines if a flush state has been enabled for the port; and removes frames from a buffer, if the flush state has been enabled for the port.

In yet another aspect of the present invention, a fibre channel switch element for removing frames is provided. The switch element includes a port having a receive segment and a transmit segment with a receive and transmit buffer, wherein the fibre channel switch element firmware sets a control bit for activating frame removal from the transmit buffer; and diverts frames that are waiting in the transmit buffer and have not been able to move from the transmit buffer.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions

The following definitions are provided as they are typically (but not exclusively) used in the fibre channel environment, implementing the various adaptive aspects of the present invention.

"EOF": End of Frame

"E-Port": A fabric expansion port that attaches to another Interconnect port to create an Inter-Switch Link.

"F_Port": A port to which non-loop N_Ports are attached to a fabric and does not include FL_ports.

"Fibre channel ANSI Standard": The standard (incorporated herein by reference in its entirety) describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"Fabric": The structure or organization of a group of switches, target and host devices (NL_Port, N_ports etc.).

"Fabric Topology": This is a topology where a device is directly attached to a fibre channel fabric that uses destination identifiers embedded in frame headers to route frames through a fibre channel fabric to a desired destination.

"FL_Port": A L_Port that is able to perform the function of a F_Port, attached via a link to one or more NL_Ports in an Arbitrated Loop topology.

"Inter-Switch Link": A Link directly connecting the E_port of one switch to the E_port of another switch.

Port: A general reference to N. Sub.—Port or F.Sub.—Port.

"L_Port": A port that contains Arbitrated Loop functions associated with the Arbitrated Loop topology.

"N-Port": A Direct Fabric Attached Port.

"NL_Port": A L_Port that can perform the function of a N_Port.

"SOF": Start of Frame

"Switch": A fabric element conforming to the Fibre Channel Switch standards.

Fibre Channel System:

To facilitate an understanding of the preferred embodiment, the general architecture and operation of a fibre channel system will be described. The specific architecture and operation of the preferred embodiment will then be described with reference to the general architecture of the fibre channel system.

Figure 1A:
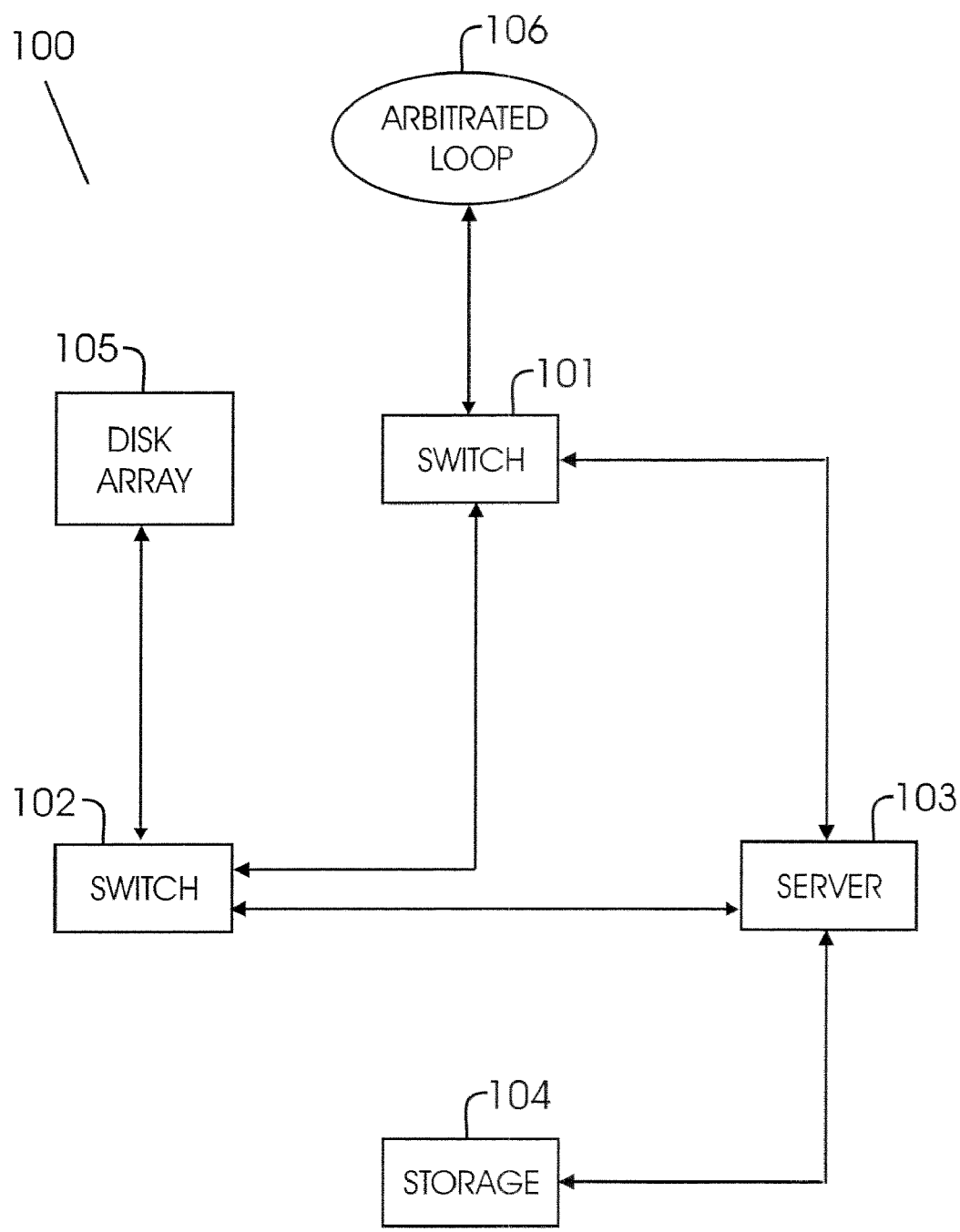
FIG. 1A shows an example of a Fibre Channel network system.

FIG. 1A is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1A are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Fabric Switch Element

Figure 1B:
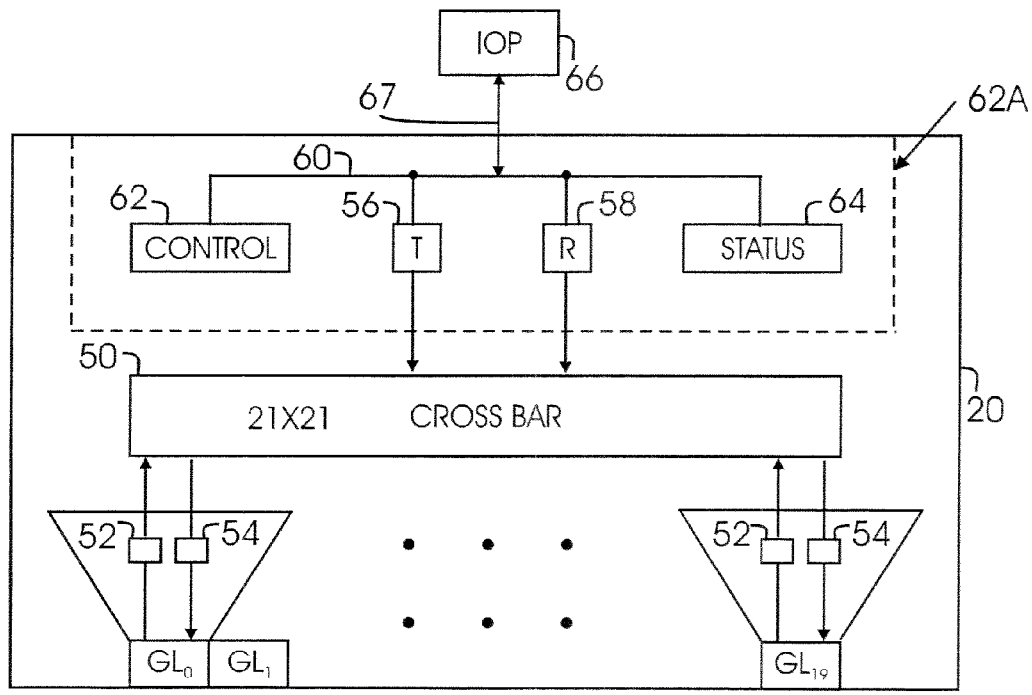
FIG. 1B shows an example of a Fibre Channel switch element, according to one aspect of the present invention.

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking fibre channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port. Also, the GL port may function as a special port useful in fabric element linking, as described below.

For illustration purposes only, all GL ports are drawn on the same side of ASIC 20 in FIG. 1B. However, the ports may be located on both sides of ASIC 20 as shown in other figures. This does not imply any difference in port or ASIC design Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

Figure 1C:
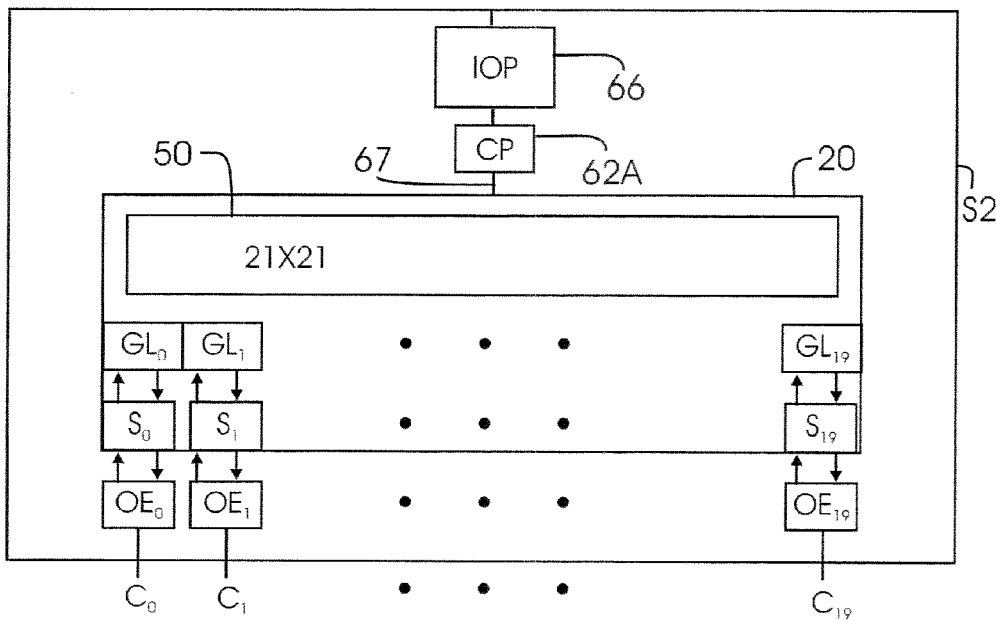
FIG. 1C shows a block diagram of a 20-channel switch chassis, according to one aspect of the present invention.

In the preferred embodiments of switch chassis described herein, the fabric controller is a firmware-programmed microprocessor, also referred to as the input/out processor ("IOP"). TOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from TOP 66, so that IOP 66 can change characteristics or operating configuration of ASIC 20 by placing certain control words in register 62. Top 66 can read status of ASIC 20 by monitoring various codes that are placed in status register 64 by monitoring circuits (not shown).

FIG. 1C shows a 20-channel switch chassis S2 using ASIC 20 and 10P 66. S2 will also include other elements, for example, a power supply (not shown). The 20 GL ports correspond to channel C0-C19. Each CL port has a serial/deserializer (SERDES) designated as S0-S19. Ideally, the SERDES functions are implemented on ASIC 20 for efficiency, but may alternatively be external to each GL port.

Each GL port has an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
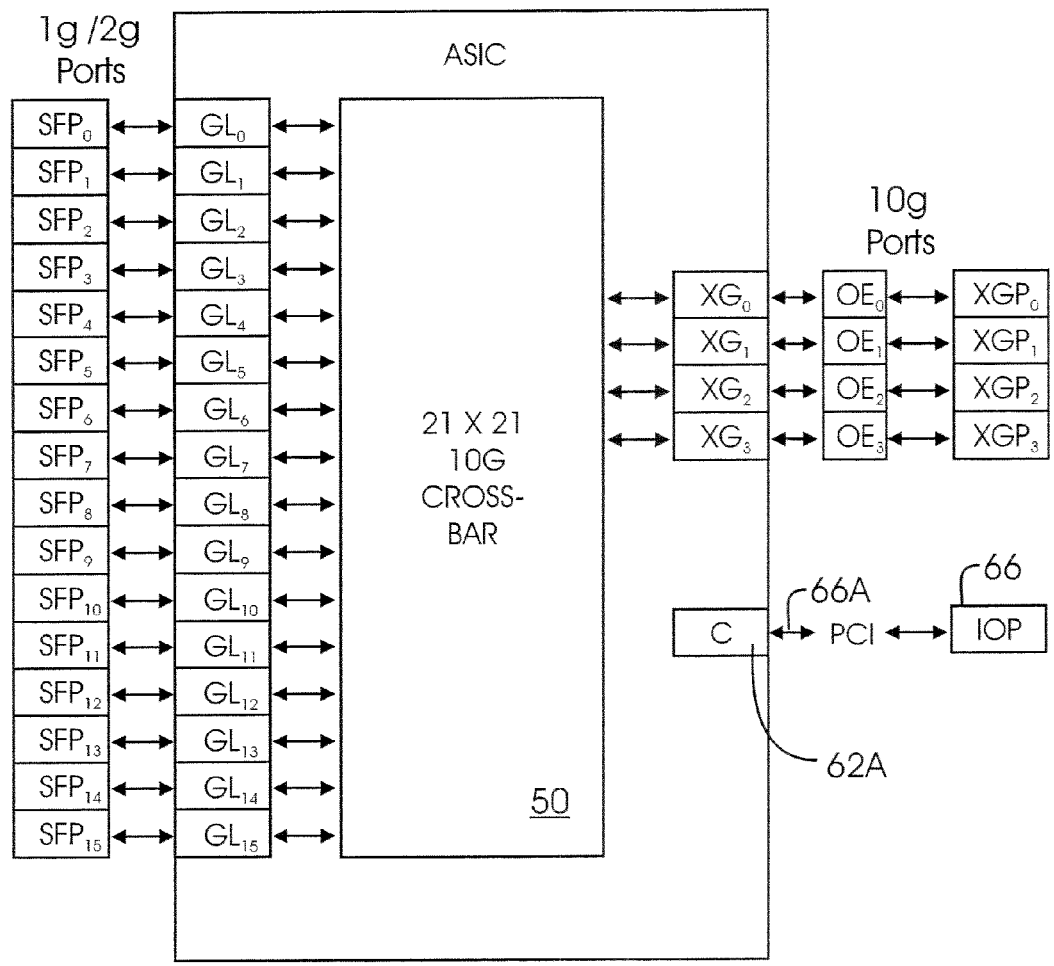
FIG. 1D shows a block diagram of a Fibre Channel switch element with sixteen GL_Ports and four 10 G ports, according to one aspect of the present invention.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figures 1, 1E:
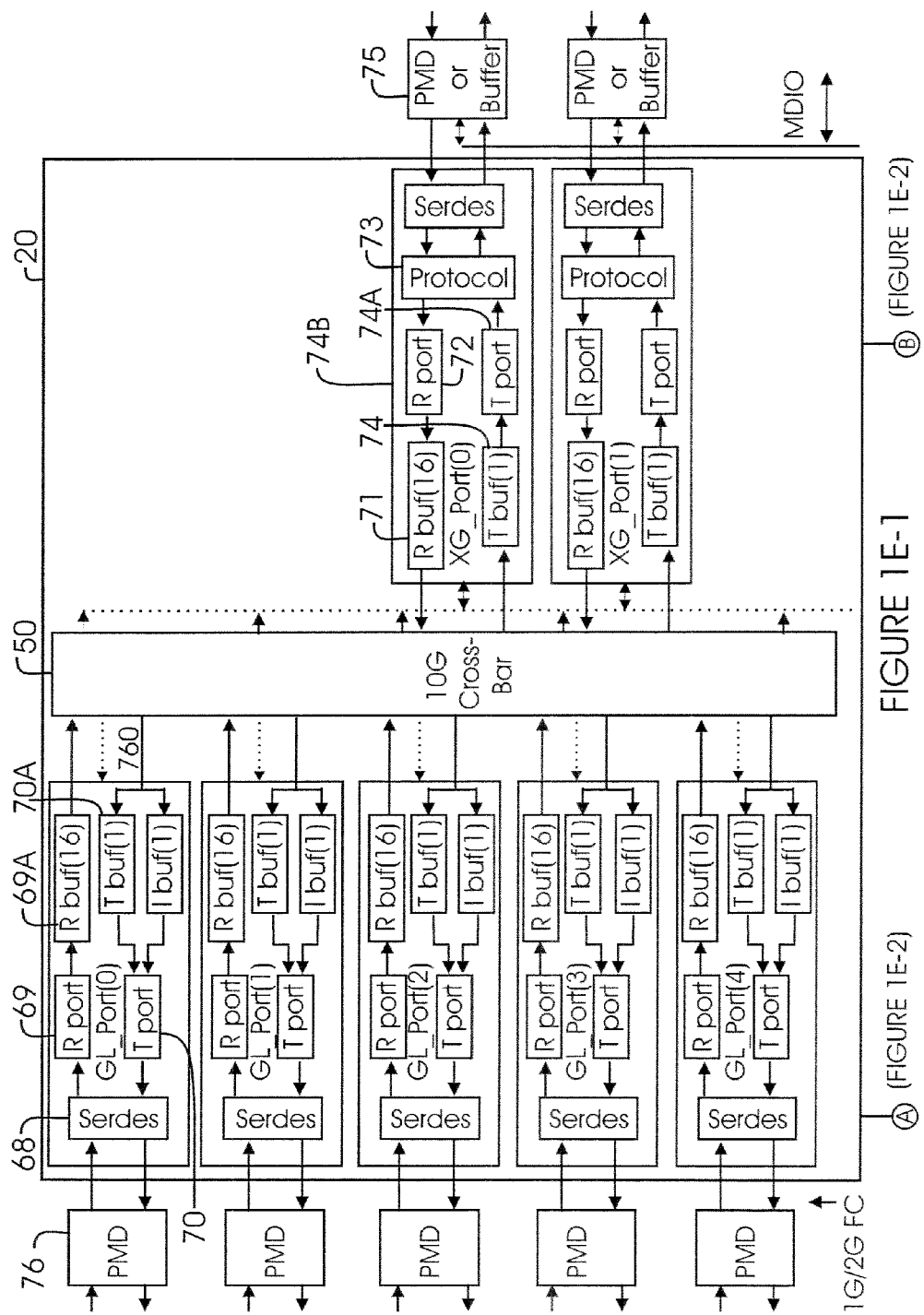
FIGS. 1E-1/1E-2 (jointly referred to as Figure BE) show another block diagram of a Fibre Channel switch element with sixteen GL_Ports and four 10 G ports, according to one aspect of the present invention.

FIG. 1E-1/1E-2 (jointly referred to as FIG. 1E) show yet another block diagram of ASIC 20 with sixteen GL and four XG port control modules. Each GL port control module has a Receive port (RPORT) 69 with a receive buffer (RBUF) 69A and a transmit port 70 with a transmit buffer (TBUF) 70A, as described below in detail. GL and XG port control modules are coupled to physical media devices ("PMD") 76 and 75 respectively.

Control port module 62A includes control buffers 62B and 62D for transmit and receive sides, respectively. Module 62A also includes a PCI interface module 62C that allows interface with IOP 66 via a PCI bus 66A.

XG_Port (for example 74B) includes RPORT 72 with RBUF 71 similar to RPORT 69 and RBUF 69A and a TBUF and TPORT similar to TBUF 70A and TPORT 70. Protocol module 73 interfaces with SERDES to handle protocol based functionality.

Figure 3A:
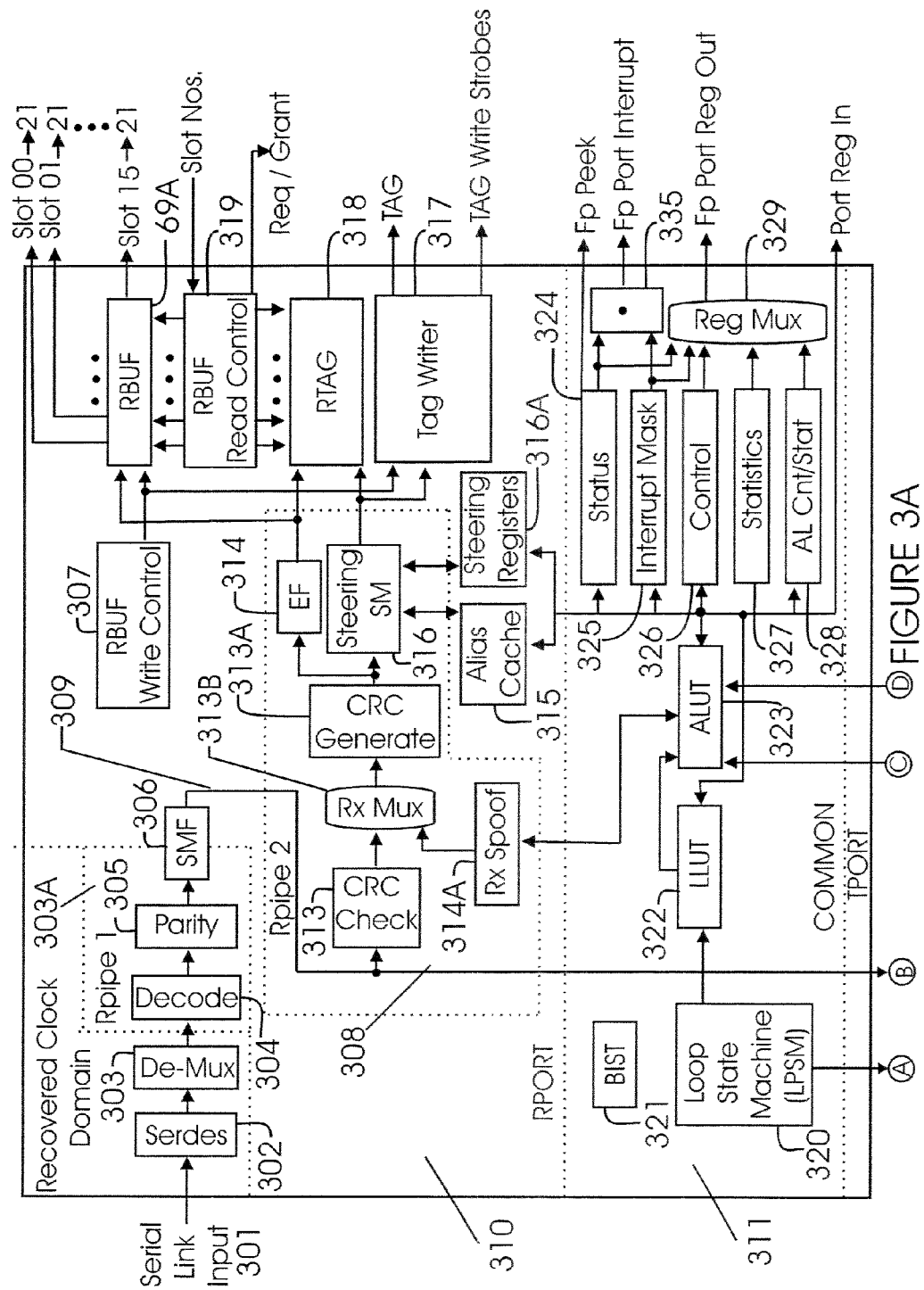
FIGS. 3A/3B (jointly referred to as FIG. 3) show a block diagram of a GL_Port, according to one aspect of the present invention.
Figure 3B:
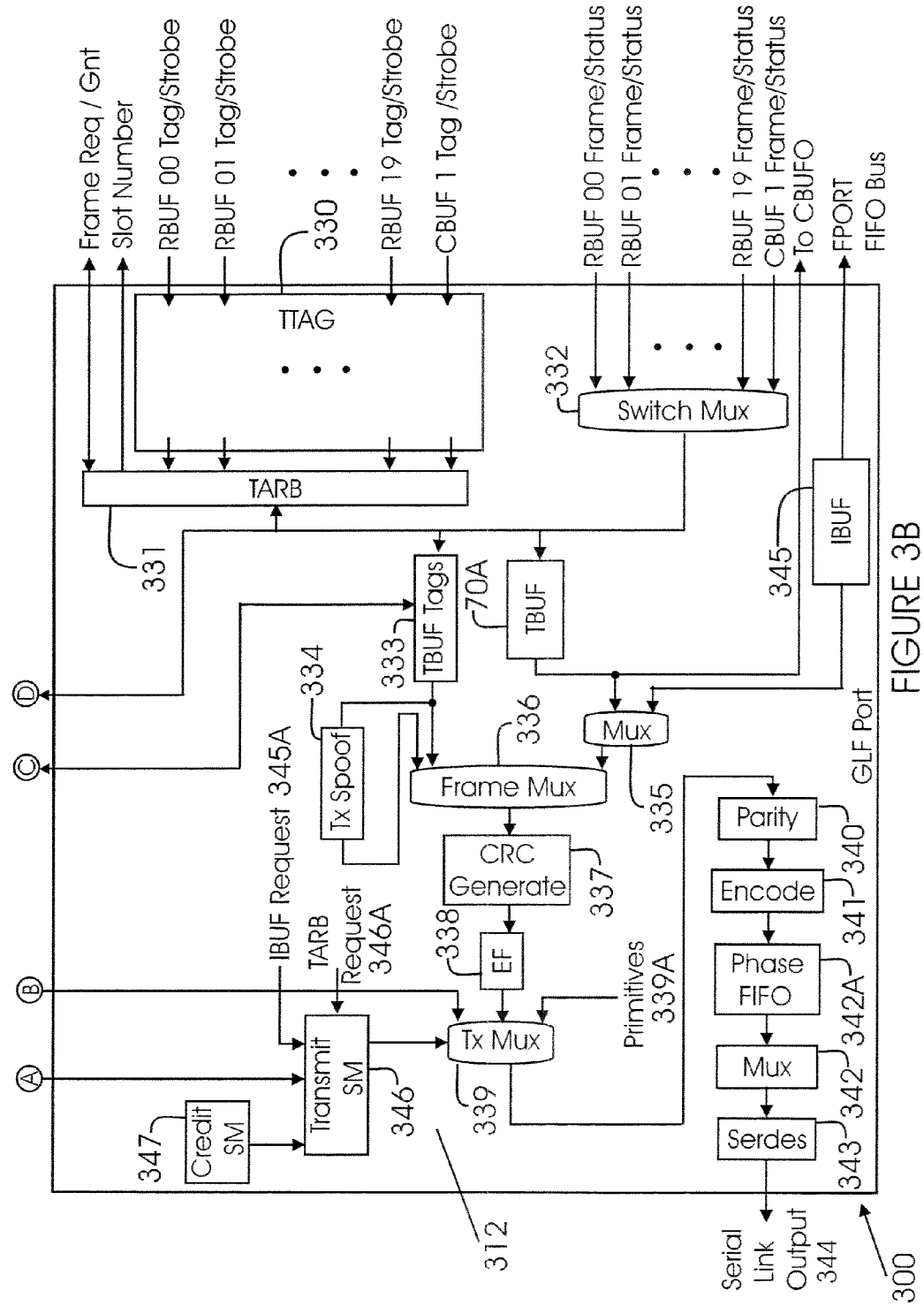

GL Port:

FIGS. 3A-3B (referred to as FIG. 3) show a detailed block diagram of a GL port as used in ASIC 20. GL port 300 is shown in three segments, namely, receive segment (RPORT) 310, transmit segment (TPORT) 312 and common segment 311.

Receive Segment of GL Port:

Frames enter through link 301 and SERDES 302 converts data into 10-bit parallel data to fibre channel characters, which are then sent to receive pipe ("Rpipe" may also be referred to as "Rpipe1" or "Rpipe2") 303A via a de-multiplexer (DEMUX) 303. Rpipe 303A includes, parity module 305 and decoder 304. Decoder 304 decodes 10B data to 8B and parity module 305 adds a parity bit. Rpipe 303A also performs various Fibre Channel standard functions such as detecting a start of frame (SOF), end-of frame (EOF), Idles, R_RDYs (fibre channel standard primitive) and the like, which are not described since they are standard functions.

Rpipe 303A connects to smoothing FIFO (SMF) module 306 that performs smoothing functions to accommodate clock frequency variations between remote transmitting and local receiving devices.

Frames received by RPORT 310 are stored in receive buffer (RBUF) 69A, (except for certain Fibre Channel Arbitrated Loop (AL) frames). Path 309 shows the frame entry path, and all frames entering path 309 are written to RBUF 69A as opposed to the AL path 308.

Cyclic redundancy code (CRC) module 313 further processes frames that enter CL port 300 by checking CRC and processing errors according to FC_PH rules. The frames are subsequently passed to RBUF 69A where they are steered to an appropriate output link. RBUF 69A is a link receive buffer and can hold multiple frames.

Reading from and writing to RBUF 69A are controlled by RBUF read control logic ("RRD") 319 and RBUF write control logic ("RWT") 307, respectively. WT 307 specifies which empty RBUF 69A slot will be written into when a frame arrives through the data link via multiplexer ("Mux") 313B, CRC generate module 313A and EF (external proprietary format) module 314. EF module 314 encodes proprietary (i.e. non-standard) format frames to standard Fibre Channel 8B codes. Mux 313B receives input from Rx Spoof module 314A, which encodes frames to a proprietary format (if enabled) RWT 307 controls RBUF 69A write addresses and provide the slot number to tag writer ("TWT") 317.

RRD 319 processes frame transfer requests from RBUF 69A. Frames may be read out in any order and multiple destinations may get copies of the frames.

Steering state machine (SSM) 316 receives frames and determines the destination for forwarding the frame. SSM 316 produces a destination mask, where there is one bit for each destination. Any bit set to a certain value, for example, 1, specifies a legal destination, and there can be multiple bits set, if there are multiple destinations for the same frame (multicast or broadcast).

SSM 316 makes this determination using information from alias cache 315, steering registers 316A, control register 326 values and frame contents. IOP 66 writes all tables so that correct exit path is selected for the intended destination port addresses.

The destination mask from SSM 316 is sent to TWT 317 and a RBUF tag register (TAG) 318. TWT 317 writes tags to all destinations specified in the destination mask from SSM 316. Each tag identifies its corresponding frame by containing an RBUF 69A slot number where the frame resides, and an indication that the tag is valid.

Each slot in RBUF 69A has an associated set of tags, which are used to control the availability of the slot. The primary tags are a copy of the destination mask generated by SSM 316. As each destination receives a copy of the frame, the destination mask in RTAG 318 is cleared. When all the mask bits are cleared, it indicates that all destinations have received a copy of the frame and that the corresponding frame slot in RBUF 69A is empty and available for a new frame.

RTAG 318 also has frame content information that is passed to a requesting destination to pre-condition the destination for the frame transfer. These tags are transferred to the destination via a read multiplexer (RMUX) (not shown).

Transmit Segment of GL Port:

Transmit segment ("TPORT") 312 performs various transmit functions. Transmit tag register (TTAG) 330 provides a list of all frames that are to be transmitted. Tag Writer 317 or common segment 311 write TTAG 330 information. The frames are provided to arbitration module ("transmit arbiter" ("TARB")) 331, which is then free to choose which source to process and which frame from that source to be processed next.

TTAG 330 includes a collection of buffers (for example, buffers based on a first-in first out ("FIFO") scheme) for each frame source. TTAG 330 writes a tag for a source and TARE 331 then reads the tag. For any given source, there are as many entries in TTAG 33Q as there are credits in RBUF 69A.

TARB 331 is activated anytime there are one or more valid frame tags in TTAG 330. TARB 331 preconditions its controls for a frame and then waits for the frame to be written into TEUF 70A. After the transfer is complete, TARE 331 may request another frame from the same source or choose to service another source.

TBUF 70A is the path to the link transmitter. Typically, frames don't land in TBUF 70A in their entirety. Mostly, frames simply pass through TBUF 70A to reach output pins, if there is a clear path.

Switch Mux 332 is also provided to receive output from crossbar 50. Switch Mux 332 receives input from plural RBUFs (shown as RBUF 00 to RBUF 19), and input from CPORT 62A shown as CBUF 1 frame/status. TARB 331 determines the frame source that is selected and the selected source provides the appropriate slot number. The output from Switch Mux 332 is sent to ALUT 323 for S_ID spoofing and the result is fed into TBUF Tags 333.

TMUX ("TxMUX") 339 chooses which data path to connect to the transmitter. The sources are: primitive sequences specified by IOP 66 via control registers 326 (shown as primitive 339A), and signals as specified by Transmit state machine ("TSM") 346, frames following the loop path, or steered frames exiting the fabric via TBUF 70A.

TSM 346 chooses the data to be sent to the link transmitter, and enforces all fibre Channel rules for transmission. TSM 346 receives requests to transmit from loop state machine 320, TBUF 70A (shown as TARB request 346A) and from various other IOP 66 functions via control registers 326 (shown as IBUF Request 345A). TSM 346 also handles all credit management functions, so that Fibre Channel connectionless frames are transmitted only when there is link credit to do so.

Loop state machine ("LPSM") 320 controls transmit and receive functions when GL_Port is in a loop mode. LPSM 320 operates to support loop functions as specified by FC-AL-2.

IOP buffer ("IBUF") 345 provides IOP 66 the means for transmitting frames for special purposes.

Frame multiplexer ("Frame Mux" or "Mux") 336 chooses the frame source, while logic (TX spoof 334) converts D_ID and S_ID from public to private addresses. Mux 336 receives input from Tx Spoof module 334, TBUF tags 333, and Mux 335 to select a frame source for transmission.

EF (external proprietary format) module 338 encodes proprietary (i.e. non-standard) format frames to standard Fibre Channel 8B codes and CRC module 337 generates CRC data for the outgoing frames.

Modules 340-343 put a selected transmission source into proper format for transmission on an output link 344. Parity 340 checks for parity errors, when frames are encoded from 8B to 10B by encoder 341, marking frames "invalid", according to Fibre Channel rules, if there was a parity error. Phase FIFO 342A receives frames from encode module 341 and the frame is selected by Mux 342 and passed to SERDES 343. SERDES 343 converts parallel transmission data to serial before passing the data to the link media. SERDES 343 may be internal or external to ASIC 20.

Common Segment of GL Fort:

As discussed above, ASIC 20 include common segment 311 comprising of various modules. LPSM 320 has been described above and controls the general behavior of TPORT 312 and RPORT 310.

A loop look up table "LLUT") 322 and an address look up table ("ALUT") 323 is used for private loop proxy addressing and hard zoning managed by firmware.

Common segment 311 also includes control register 326 that controls bits associated with a GL_Port, status register 324 that contains status bits that can be used to trigger interrupts, and interrupt mask register 325 that contains masks to determine the status bits that will generate an interrupt to IOP 66. Common segment 311 also includes AL control and status register 328 and statistics register 327 that provide accounting information for FC management information base ("MIB").

Output from status register 324 may be used to generate a Fp Peek function. This allows a status register 324 bit to be viewed and sent to the CPORT.

Output from control register 326, statistics register 327 and register 328 (as well as 328A for an X_Port, shown in FIG. 4) is sent to Mux 329 that generates an output signal (FP Port Reg Out).

Output from Interrupt register 325 and status register 324 is sent to logic 335 to generate a port interrupt signal (FP Port Interrupt).

BIST module 321 is used for conducting embedded memory testing.

XG Port

Figure 4A:
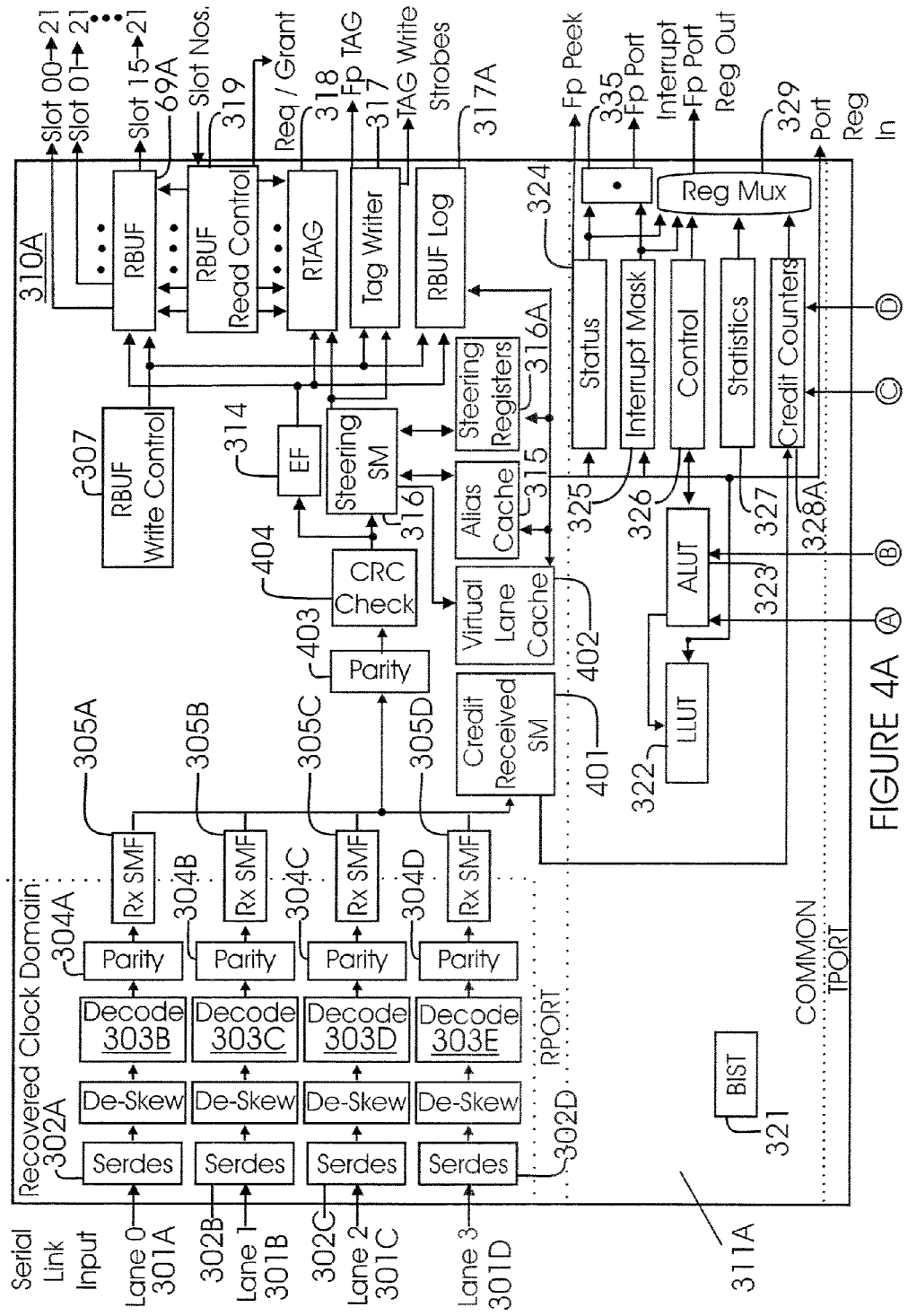
FIGS. 4A/4B (jointly referred to as FIG. 3) show a block diagram of XG_Port (10 G) port, according to one aspect of the present invention.
Figure 4B:
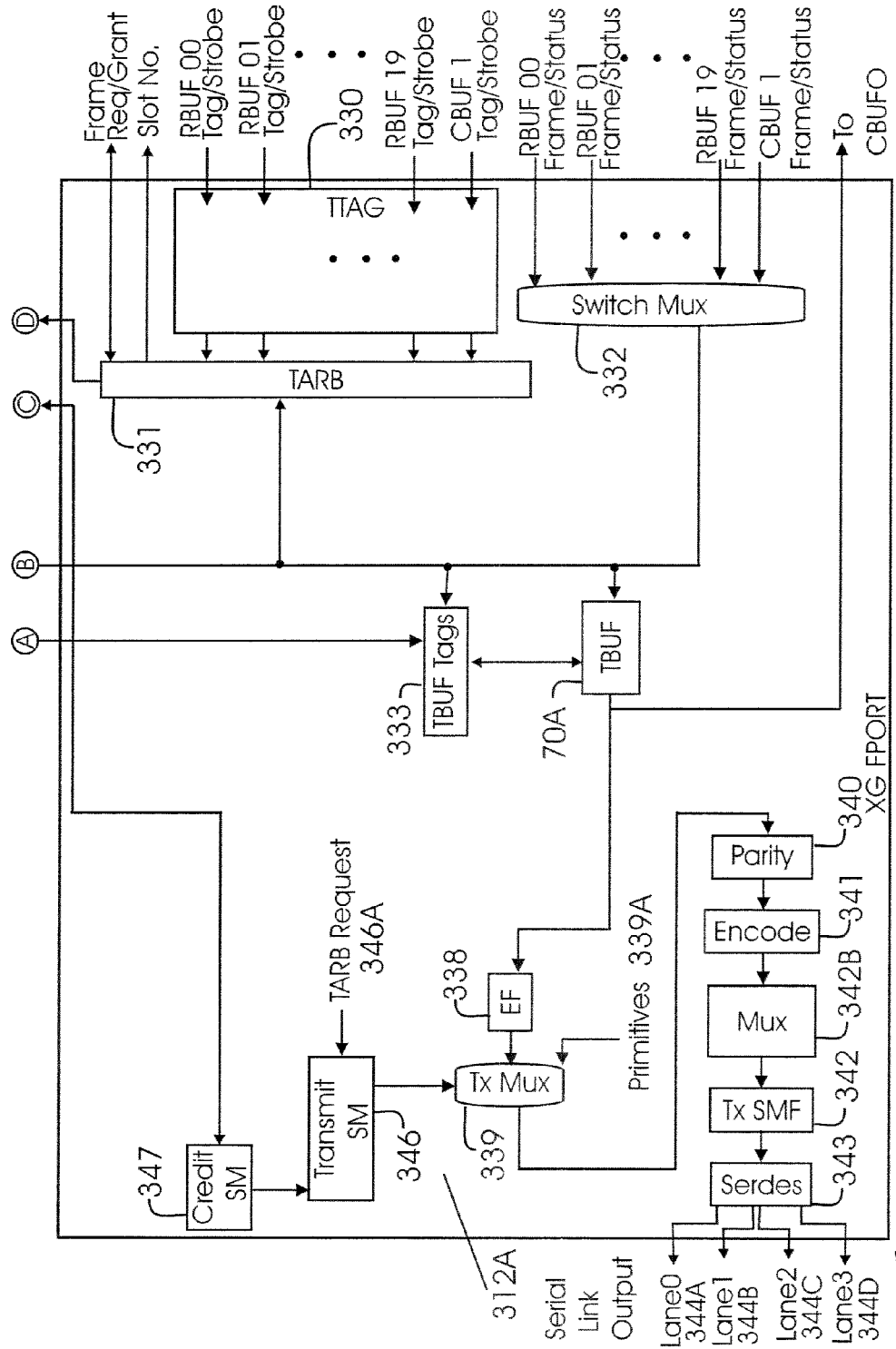

FIGS. 4A-4B (referred to as FIG. 4) show a block diagram of a 10 G Fibre Channel port control module (XG FPORT) 400 used in ASIC 20. Various components of XG FPORT 400 are similar to CL port control module 300 that are described above. For example, RPORT 310 and 310A, Common Port 311 and 311A, and TPORT 312 and 312A have common modules as shown in FIGS. 3 and 4 with similar functionality.

RPORT 310A can receive frames from links (or lanes) 301A-301D and transmit frames to lanes 344A-344D. Each link has a SERDES (302A-302D), a de-skew module, a decode module (303B-303E) and parity module (304A-304D). Each lane also has a smoothing FIFO (SMF) module 305A-305D that performs smoothing functions to accommodate clock frequency variations. Parity errors are checked by module 403, while CRC errors are checked by module 404.

RPORT 310A uses a virtual lane ("VL") cache 402 that stores plural vector values that are used for virtual lane assignment. In one aspect of the present invention, VL Cache 402 may have 32 entries and two vectors per entry. IOP 66 is able to read or write VL cache 402 entries during frame traffic. State machine 401 controls credit that is received. On the transmit side, credit state machine 347 controls frame transmission based on credit availability. State machine 347 interfaces with credit counters 328A.

Also on the transmit side, modules 340-343 are used for each lane 344A-344D, i.e., each lane can have its own module 340-343. Parity module 340 checks for parity errors and encode module 341 encodes 8-bit data to 10 bit data. Mux 342B sends the 10-bit data to a smoothing FIFO ("TxSMF") module 342 that handles clock variation on the transmit side. SERDES 343 then sends the data out to the link.

Tag Flush Operation:

In one aspect of the present invention, any transmit port can be set up to remove all frames from a specified source port. Firmware can set control bits (in control register 326) that govern the policy as to how the frames are disposed. A "flush" state is set for all transmitters, controlled by firmware. The flush state allows transmitters to dispose frames from a source port. If no frames are associated with a selected source port, then normal processing occurs.

Transmit port (XG and/or GE, ports, See FIGS. 3 and 4) include flush state flip-flops (in this example, twenty flip-flops). Each flip-flop when set, indicates that one of nineteen Receive Ports or CBUF 62A should have all of its frames removed. Firmware determines when to set or clear each individual state flip-flop. If firmware clears the active state flip-flop(s) before all of the source frames are removed, then the transmit port will stop removing frames. Any remaining frames in RBUF 69A would be transmitted. Once RBUF 69A is emptied of all frames, the transmit port will resume normal transmission of frames from other source ports.

Frames are removed from RBUF 69A as if it were a normal transfer. The source RBUF 69A being emptied does not know that the special "flush" state is active. The transfer process does not take very long because the internal crossbar 50 will transfer these frames at the 10 G rate, and TARB 331 gives top priority to any source port being flushed.

The frames removed from RBUF 69A increment the count of R_RDYs to be transmitted as normal. If the frames are being removed because the receive port is being reset with a "Link Reset" primitive (defined by fibre channel standards), the R_RDYs are not sent yet because the transmitter should be sending the reset primitive. In this case, the transmit R_RDY count is cleared by firmware before the transmitter sends Idles again.

The transferred frames land in TBUF 70A and are disposed of as instructed by firmware control bits.

There are several ways that TBUF 70A can dispose of transferred frames. For example, TBUF 70A can transfer the frame in its entirety to CBUF 62D. From there the frames will pass out of ASIC 20 to IOP 66.

Another option for Class 2 or class 3 frames would be to toss them or throw them away. Any class 3 frame that is tossed will increment a class 3 toss counter. Firmware can read the value of this counter to see how many class 3 frames have been tossed.

Any class 2 frames that are tossed will set a class 2 toss error status bit. There is no counter for tossed class 2 frames.

TBUF 70A has another option in dealing with class 2 frames. Since fibre channel class 2 frames require an acknowledgment upon delivery, it is undesirable to toss them. It is also undesirable to send entire frames to control port 62A. These frames would then transfer out of ASIC 20 to IOP 66. The PCI bus cannot match the internal transfer rate of frames, and cause a bottleneck. The solution to this problem is to truncate class 2 frames to minimum frame length to reduce the number of clock cycles needed to get the class 2 frames out of ASIC 20. Firmware can extract the source information from a truncated frame and generate the required response.

As mentioned above, TARB 331 gives top priority to any source port being flushed. This can be done as follows:

To give top priority over other non-flushing source ports, all non-flushing frame tag valids are blocked, and are not visible to TARB 331. This blocking of valids occurs when there is one or more valid frame tags for a flushed port. Having the flush state flip-flop set without a frame tag valid for that same port is not enough to block other frame tag valids.

Top priority is also given to frames that are flushed over controls that prevent frame transfers when active. These controls that prevent frame transfers are a "busy" signal that stops all receive buffer transfers, absence of credit, absence of virtual lane credit/credit and/or bandwidth limiting logic. Everything possible is done to get these frames removed from the source port receive buffers as soon as possible.

Figures 1, 1E, 2:
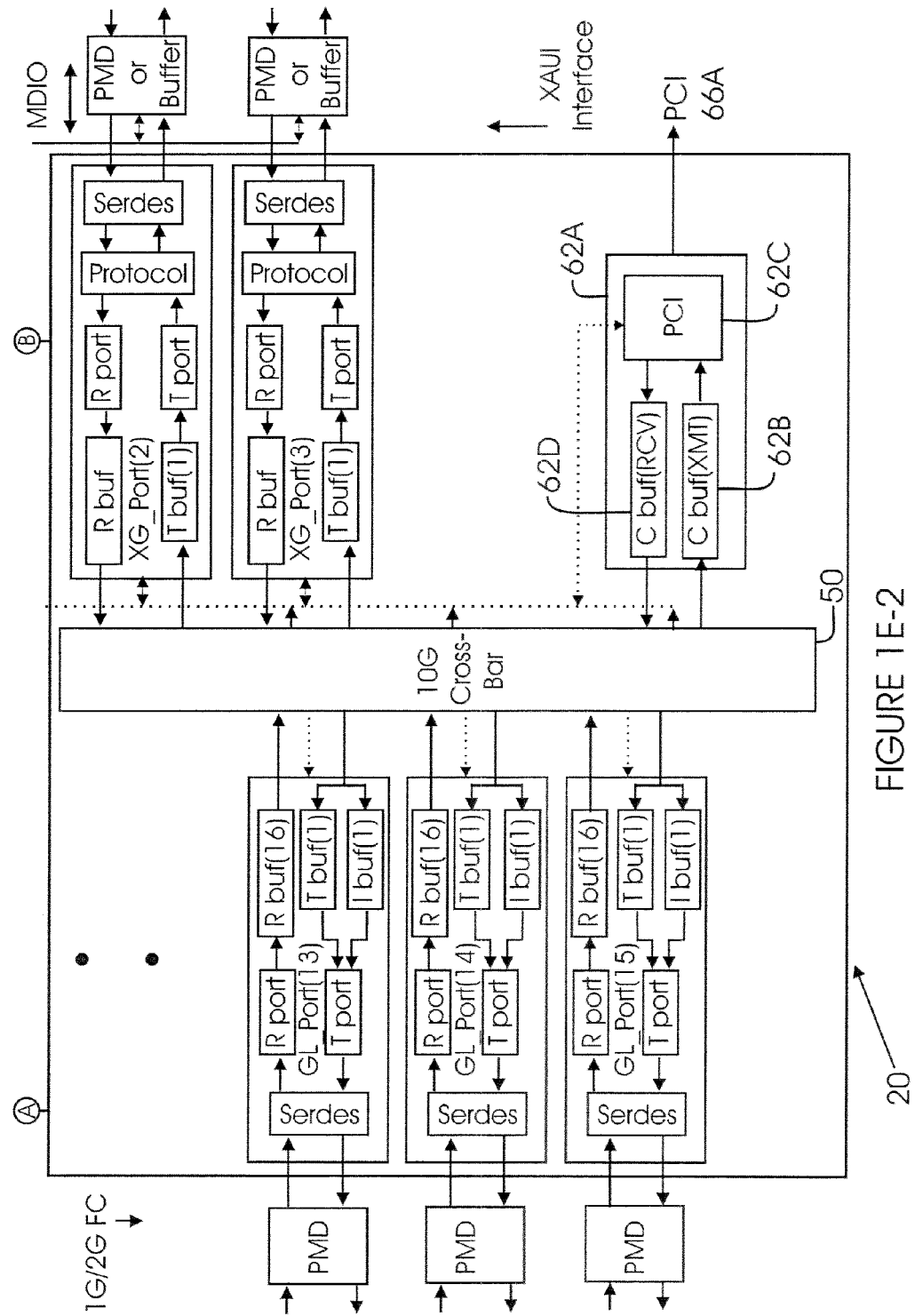
FIG. 2 shows a process flow diagram for flushing frames, according to one aspect of the present invention.
Figure 2:
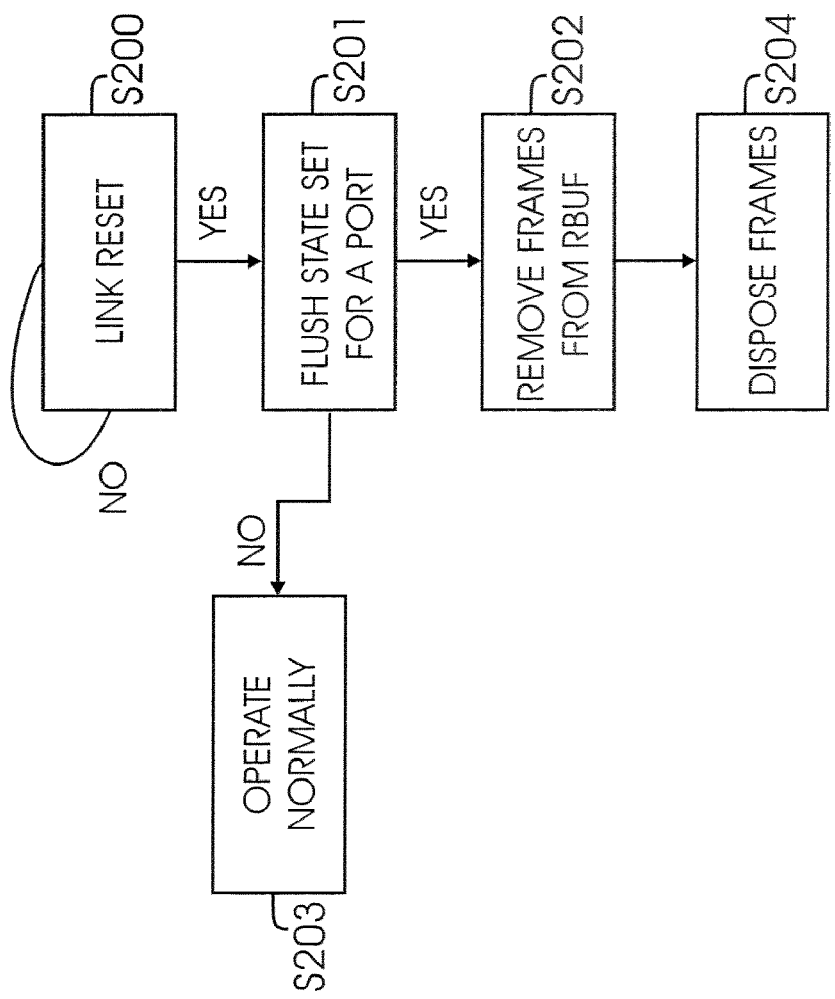

FIG. 2 shows a flow diagram of executable process steps that summarizes the foregoing "flush" state operations, according to one aspect of the present invention.

Turning in detail to FIG. 2, in step S200, the process determines if a port link is being reset. If not, then the process waits for a reset.

If a link is being reset, then in step S201, the process determines if the flush state for a port is set. As described above, firmware for ASIC 20 can set the state using flip-flops or any other type of logic. The flush state denotes that frames must be removed from RBUF 69A of a particular port.

If the flush state is not set, then in step S203, the port operates normally, without disruption.

If the flush state is set, then in step S202, frames are removed from RBUF 69A. The removal itself is similar to normal frame transfer.

In step S204, the frames are discarded by TBUF 70A. As discussed above, frames are discarded based on a policy, which is controlled by firmware.

In one aspect of the present invention, there is no disruption in the ports that are not affected by reset, and hence improves overall system efficiency.

Flush TBUF Operation in TBUF 70A:

In one aspect of the present invention, activating a "flush TBUF" control bit in control register 326 diverts any frame in TBUF 70A that is waiting to be transferred. Firmware can set this bit and activation of this control bit causes a one time event in the transmit port, which causes the frame to be diverted.

If the one time event occurs while a frame is waiting in TBUF 70A, then the frame is diverted. If the activation of the one time event occurs while a frame is being transferred, then the event is ignored. Also, if the activation of the one time event occurs before a frame is waiting then it will be ignored.

The flush TBUF bit allows ASIC 20 to move a frame that is unable to move out of TBUF 70A for whatever reason. Getting the frame out creates a path for a source flush state function to proceed. The diverted frame follows the controls set up for a "flush state" function, described above.

There are several ways that TBUF 70A can dispose the "diverted" frame(s). For example, TBUF 70A can transfer the frame in its entirety to CBUF 62D. From there the frames will pass out of ASIC 20 to IOP 66.

Another option for Class 2 or class 3 frames would be to toss them or throw them away. Any class 3 frame that is tossed will increment a class 3 toss counter. Firmware can read the value of this counter to see how many class 3 frames are being tossed.

Any class 2 frames that are tossed will set a class 2 toss error status bit. There is no counter for tossed class 2 frames.

TBUF 70A has another option in dealing with class 2 frames. Since fibre channel class 2 frames require an acknowledgment upon delivery, it is undesirable to toss them. It is also undesirable to send entire frames to control port 62A. These frames would then transfer out of ASIC 20 to IOP 66. The PCT bus cannot match the internal transfer rate of frames, and causes a bottleneck. The solution to this problem is to truncate class 2 frames to minimum frame length to reduce the number of PCI bus cycles needed to get the class 2 frames out of the ASIC. Firmware can extract the source information from a truncated frame, to generate the required response.

Force TBUF Revector Operation:

In another aspect of the present invention, a frame that is waiting to be transferred from TBUF 70A can be diverted by activating a "Force TBUF Revector" control bit in control register 326. Firmware can activate this control bit. Activation of this control bit causes a one time event in the transmit port, which in turn causes the frame to be diverted to IOP 66.

The frame is diverted if the one time event occurs while the frame is waiting. If the activation occurs while a frame is being transferred, then the event is ignored. Also, the activation is ignored if it occurs before a frame is waiting.

Firmware for ASIC 20 can read a status register 325 bit to determine when to activate the "Force TBUF Revector" bit. The status bit is set when a frame has been waiting for more than X milliseconds (for example, 10 milliseconds).

This function moves a frame that is unable to move for whatever reason. This creates a path for a source "flush state" function to proceed, as described above.

Any frame that is diverted from TBUF 70A with the "Force TBUF Revector" control bit is transferred to CBUF 62D, in its entirety. Firmware then decides whether the diverted frame is written back into ASIC 20, to be transmitted out of the same port that diverted it, or if the frame should be discarded.

If the diverted frame is written back into ASIC 20, it is important that transmitted frames stay in the proper order. TBUF 70A and TARB 331 help maintain the proper frame order.

When a frame is diverted using the "Force TBUF Revector" control bit, TBUF 70A activates a holding register (not shown) called "Tx_Busy_1". When "Tx_Busy_1" is active, TARB 331 only accepts frames from control port input buffer 62B, or frames that are being flushed with the source flush state function.

Any frames flushed using the source flush state function are not transmitted. Flushed frames are either diverted to control port output buffer 62D or are discarded. Any frame from the control port input buffer 62D is the diverted frame that set the "Tx_Busy_1" holding register. This is the first frame transmitted from that port after "Force TBUF Revector" is asserted. If this is the only frame that firmware wants to send out of this transmit port, it can set the "CB" data bit in the last word of the frame. Setting this data bit clears the "Tx_Busy_1" holding register, as the frame exits TBUF 70A. Thus allowing frame transfers from RBUF 69A to start flowing again.

If firmware decides that the frame diverted using the "Force TBUF Revector" control bit should be discarded, then the "Tx_Busy_1" holding register is cleared without writing a frame into control port 62A. Firmware can write a control register 326 bit, which will clear the "Tx_Busy_1" holding register. This allows frame transfers from RBUF 69A to start flowing again.

In one aspect of the present invention, the overall efficiency of ASIC 20 is improved because frames that have been waiting to be transferred can be diverted using various options, as described above.

TBUF Repeat Frame Functionality:

TBUF 70A "repeat frame" state is a mode of operation during which a frame received from CBUFI 62B is transmitted continuously. Firmware sets a control bit called "TBUF repeat frame" in control register 326 to activate this state. Along with this control bit being active, TBUF 70A transfers a frame to a transmitter and the frame is sourced in CBUFI 62D, which is also controlled by firmware.

It is noteworthy that the repeat frame functionality is useful in arbitrated loop initialization ("LISM" frame, as defined by FC-AL-2 standard), as well as for diagnostics.

A frame transferred to a transmitter that was sourced in a receive port does not enter the repeat state. Any exception frames transmitted to the control port output buffer 62B, or are discarded, do not enter the repeat state.

Once in the repeat frame state, TARB 331 does not select any more frames to transfer. The only frame that is to be transmitted is held in TBUF 70A. The first word of the frame is written into address zero of TBUF 70A; therefore, the starting address of each repeated read will be address zero.

Once the read begins, the read address counter (not shown) starts to increment just like all reads. The read address counter will continue to increment until the end of frame is sent to the transmitter. At this point the read address is cleared, and is ready to start another repeated read. After each repeated read a TBUF 70A ready signal is deactivated and then activated again to let the transmitter know that the buffer has another frame to transmit.

To exit the repeat frame state, firmware clears the control register 326 bit that enables the state. Any transfer in progress when the control bit is cleared will continue to the end. The absence of the control bit prevents the next repeated transfer from starting.

Although the present invention has been described with reference to specific embodiments, these embodiments are illustrative only and not limiting. Many other applications and embodiments of the present invention will be apparent in light of this disclosure and the following claims.

What is claimed is:

1. A method for a switch element, comprising:
   configuring a port of the switch element to operate in a repeat frame mode; wherein during the repeat frame mode a transmit segment of the port continuously transmits a frame that is received from a common control segment of the switch element;
   transferring the frame from the common segment that is managed by processor executable code for the switch element;
   continuously transmitting the transferred frame; and
   disabling the repeat frame mode using the common control segment.

2. The method of claim 1, wherein the repeat frame mode is configured by setting a bit value in the common control segment.

3. The method of claim 1, wherein only the frame from the common control segment is transmitted during the repeat frame mode and any other frame staged at a receive segment of the switch element waits to be transmitted.

4. The method of claim 1, wherein the repeat frame mode is disabled by setting a bit value in the common control segment.

5. A switch element, comprising:
   a plurality of ports, each port having a receive segment for receiving frames and a trans-mit segment for transmitting frames; and
   a configurable common segment for configuring the plurality of ports;
   wherein a port from among the plurality of ports is configured to operate in a repeat frame mode; wherein during the repeat frame mode a transmit segment of the port continuously transmits a frame that is received from the configurable common control segment of the switch; and processor executable code for the switch element disables the repeat frame mode using the configurable common control segment.

6. The switch element of claim 5, wherein the repeat frame mode is configured by setting a bit value in the configurable common control segment.

7. The switch element of claim 5, wherein only the frame from the configurable common control segment is transmitted during the repeat frame mode and any other frame staged at a receive segment of the port waits to be transmitted.

8. The method of claim 5, wherein the repeat frame mode is disabled by setting a bit value in the configurable common control segment.

9. A method for a switch element for receiving and transmitting frames, comprising:
   establishing a disposal policy for handling frames that are removed during a flush state operation; wherein during the flush state operation a transmit segment of a port from among a plurality of ports of the switch element selectively removes a frame that is temporarily stored at a receive segment of the port;
   configuring the port to operate in a flush state;
   detecting a condition to trigger the flush state operation;
   removing frames stored at the receive segment of the port, without the receive segment being aware of the flush state operation; and
   disposing the frame based on the disposal policy set for handling frames that are removed during the flush state operation.

10. The method of claim 9, wherein a communication link reset is a condition that triggers the flush state operation.

11. The method of claim 9, wherein all frames from a source port are removed during the flush state operation, before frames from another source port are processed.

12. The method of claim 9, wherein the disposal policy is established by setting a control bit in a control segment of the switch element.

13. The method of claim 9, wherein frames removed during the flush state operation are discarded.

* * * * *

UNITED STATES PATENT AND TRADEMARK OFFICE
CERTIFICATE OF CORRECTION

| | |
|---|---|
| PATENT NO. | : 7,936,771 B2 |
| APPLICATION NO. | : 12/189502 |
| DATED | : May 3, 2011 |
| INVENTOR(S) | : Dropps et al. |

It is certified that error appears in the above-identified patent and that said Letters Patent is hereby corrected as shown below:

Title Page
On page 2, under "Other Publications", in column 2, line 34, delete "2OO8" and insert -- 2008 --, therefor.

In column 3, line 20, delete "or" and insert -- of --, therefor.

In column 3, line 62, delete "BE)" and insert -- 1E) --, therefor.

In column 5, line 41, after "design" insert -- . --.

In column 5, line 60, delete "TOP" and insert -- IOP --, therefor.

In column 6, line 2, delete "TOP" and insert -- IOP --, therefor.

In column 6, line 4, delete "Top" and insert -- IOP --, therefor.

In column 6, line 8, delete "1OP" and insert -- IOP --, therefor.

In column 6, line 10, delete "CL" and insert -- GL --, therefor.

In column 7, line 5, delete "CL" and insert -- GL --, therefor.

In column 7, line 12, delete "WT" and insert -- RWT --, therefor.

In column 7, line 21, after "enabled)" insert -- . --.

In column 7, line 39, delete "(TAG)" and insert -- (RTAG) --, therefor.

In column 7, line 67, delete "TARE" and insert -- TARB --, therefor.

Signed and Sealed this
Twenty-third Day of August, 2011

David J. Kappos
*Director of the United States Patent and Trademark Office*

CERTIFICATE OF CORRECTION (continued)
U.S. Pat. No. 7,936,771 B2

In column 8, line 2, delete "33Q" and insert -- 330 --, therefor.

In column 8, line 6, delete "TEUF" and insert -- TBUF --, therefor.

In column 8, line 6, delete "TARE" and insert -- TARB --, therefor.

In column 8, line 60, delete "Fort:" and insert -- Port: --, therefor.

In column 8, line 65, delete ""LLUT")" and insert -- ("LLUT") --, therefor.

In column 9, line 25, delete "CL" and insert -- GL --, therefor.

In column 9, line 62, delete "GE" and insert -- GL --, therefor.

In column 10, line 56, delete "credit/credit" and insert -- credit, credit --, therefor.

In column 11, line 47, delete "PCT" and insert -- PCI --, therefor.

In column 13, line 39, in Claim 5, delete "trans-mit" and insert -- transmit --, therefor.